United States Patent
Zhang et al.

(10) Patent No.: US 7,890,637 B1
(45) Date of Patent: Feb. 15, 2011

(54) SECURE COMMUNICATIONS IN A SYSTEM HAVING MULTI-HOMED DEVICES

(75) Inventors: Ying Zhang, Milpitas, CA (US); Jesse Shu, Palo Alto, CA (US); Krishna Narayanaswamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 237 days.

(21) Appl. No.: 12/036,669

(22) Filed: Feb. 25, 2008

(51) Int. Cl.
G06F 15/16 (2006.01)

(52) U.S. Cl. .................... 709/227; 709/213; 709/230; 709/238; 370/401

(58) Field of Classification Search ................ 709/227, 709/228
See application file for complete search history.

(56) References Cited

U.S. PATENT DOCUMENTS

| | | | | |
|---|---|---|---|---|
| 7,107,609 | B2 * | 9/2006 | Cheng et al. ............... | 726/3 |
| 7,457,882 | B2 * | 11/2008 | Stewart et al. ............. | 709/230 |
| 2004/0097232 | A1 * | 5/2004 | Haverinen ................. | 455/436 |
| 2005/0120090 | A1 * | 6/2005 | Kamiya ..................... | 709/213 |
| 2005/0198029 | A1 * | 9/2005 | Pohja et al. ................ | 707/8 |
| 2005/0273595 | A1 * | 12/2005 | Ogawa et al. .............. | 713/153 |
| 2006/0120386 | A1 * | 6/2006 | Rossi et al. ................ | 370/401 |
| 2006/0129694 | A1 * | 6/2006 | Ishida et al. ............... | 709/238 |
| 2008/0133757 | A1 * | 6/2008 | Etelapera .................. | 709/227 |
| 2008/0144095 | A1 * | 6/2008 | Suzuki ...................... | 358/1.15 |
| 2008/0306640 | A1 * | 12/2008 | Rosenthal et al. .......... | 701/19 |

OTHER PUBLICATIONS

R. Stewart et al., "Stream Control Transmission Protocol," Network Working Group, Request for Comments: 2960, http://www.ietf.org/rfc/rfc2960.txt, Oct. 2000, 114 pgs.

* cited by examiner

*Primary Examiner*—Wing F Chan
*Assistant Examiner*—Tesfay Yohannes
(74) *Attorney, Agent, or Firm*—Shumaker & Sieffert, P.A.

(57) ABSTRACT

This disclosure relates to a secure network device for multi-homed devices. An example network device includes a state table, an association establishment module, and an inspection module. The state table is configured to store information for communication associations between devices. The association establishment module is configured to process a request to establish a communication association between a first device and a second device and to store state information for the communication association in the state table. The first device and the second device each comprise a multi-homed device associated with a plurality of Internet Protocol (IP) addresses, and the state information includes the IP addresses associated with the first device and the IP addresses associated with the second device. The inspection module is configured to secure the communication association between the first device and the second device by using the state information that is stored in the state table.

33 Claims, 7 Drawing Sheets

SECURE COMMUNICATIONS IN A SYSTEM HAVING MULTI-HOMED DEVICES

TECHNICAL FIELD

This disclosure relates to data communications within a system that includes multi-homed devices.

BACKGROUND

In a data processing system, different devices may communicate with each other using one or more data transmission protocols. Certain protocols support multi-homing. Multi-homing allows a device to have more than one Internet Protocol (IP) address. One such protocol that supports multi-homing is the Stream Control Transmission Protocol (SCTP). SCTP is an IP transport protocol, which operates at an equivalent level to the User Datagram Protocol (UDP) and the Transmission Control Protocol (TCP), which currently provide transport layer functions for many of the main Internet applications. SCTP may be used in various different types of applications, including certain mobile and wireless applications, Signaling System 7 (SS7) applications, or Voice-Over-IP (VoIP) applications. In applications like these, it may be desirable or even necessary, on occasions, for a device to use more than one IP address during the course of a communication association with another device.

Since SCTP traffic is typically transported through the Internet, it can potentially be attacked by hackers. Standard SCTP may utilize TCP-based inspection techniques. TCP-based inspection establishes associations based on a five-tuple, which is specified as follows: <protocol number, source IP, source port, destination IP, destination port>. State information or a state table may be maintained by one or more network devices within the system, such as firewalls, to store and maintain state information about associations using the five-tuple data structure. Devices that implement SCTP, however, can consist of multiple IP addresses. For an SCTP message sent by a device, the major IP address of that device is typically stored in the IP header of the message, while the additional IP addresses may be stored inside SCTP application data of the message. When the five-tuple data structure is used, however, only the major IP addresses included within SCTP messages are monitored. Consequently, SCTP traffic using multiple IP addresses may not be handled correctly by existing firewalls when a device switches its identity from one IP address to another.

SUMMARY

In general, this disclosure describes a secure network device, such as a firewall, that stands between SCTP devices. The firewall is capable of screening out malicious traffic transported by SCTP messages and secures the SCTP communication between the devices. Unlike traditional TCP-based firewalls that are designed for single-homing devices (that each have only one IP address), the SCTP-secure device, or firewall, of the present disclosure supports multi-homing SCTP devices that support multiple IP addresses.

A firewall that secures SCTP communications performs stateful inspection that uses a seven-tuple data structure instead of the conventional five-tuple data structure described above. Specifically, the seven-tuple structure contains the following fields: <protocol number, source IP list, source port, source tag, destination IP list, destination port, destination tag>. The source IP list contains a complete list of IP addresses for the source (i.e., the device requesting that an association be established), and the destination IP list contains a complete list of IP addresses for the destination (i.e., the device accepting the association request). Each time an SCTP message arrives at the firewall, the firewall searches the corresponding source/destination IP addresses contained in the message within the source/destination IP lists in the seven-tuple state information, and makes a decision whether to forward or drop the message if there is a match. As a result, the firewall provides security for multi-homed devices that may, on occasion, switch over from one IP address during the course of a communication (such as, for example, in voice or wireless applications).

In one embodiment, a method performed by a network device includes processing a request to establish a communication association between a first device and a second device, wherein the first device and the second device each comprise a multi-homed device associated with a plurality of Internet Protocol (IP) addresses, storing state information for the communication association in a state table, wherein the state information includes the plurality of IP addresses associated with the first device and the plurality of IP addresses associated with the second device, and using the state information to secure the communication association between the first device and the second device.

In one embodiment, a network device includes a state table, an association establishment module, and an inspection module. The state table is configured to store information for communication associations between devices. The association establishment module is configured to process a request to establish a communication association between a first device and a second device and to store state information for the communication association in the state table. The first device and the second device each comprise a multi-homed device associated with a plurality of Internet Protocol (IP) addresses, and the state information includes the IP addresses associated with the first device and the IP addresses associated with the second device. The inspection module is configured to secure the communication association between the first device and the second device by using the state information that is stored in the state table.

The details of one or more embodiments of the invention are set forth in the accompanying drawings and the description below. Other features, objects, and advantages will be apparent from the description and drawings, and from the claims.

DETAILED DESCRIPTION

Figure 1A:
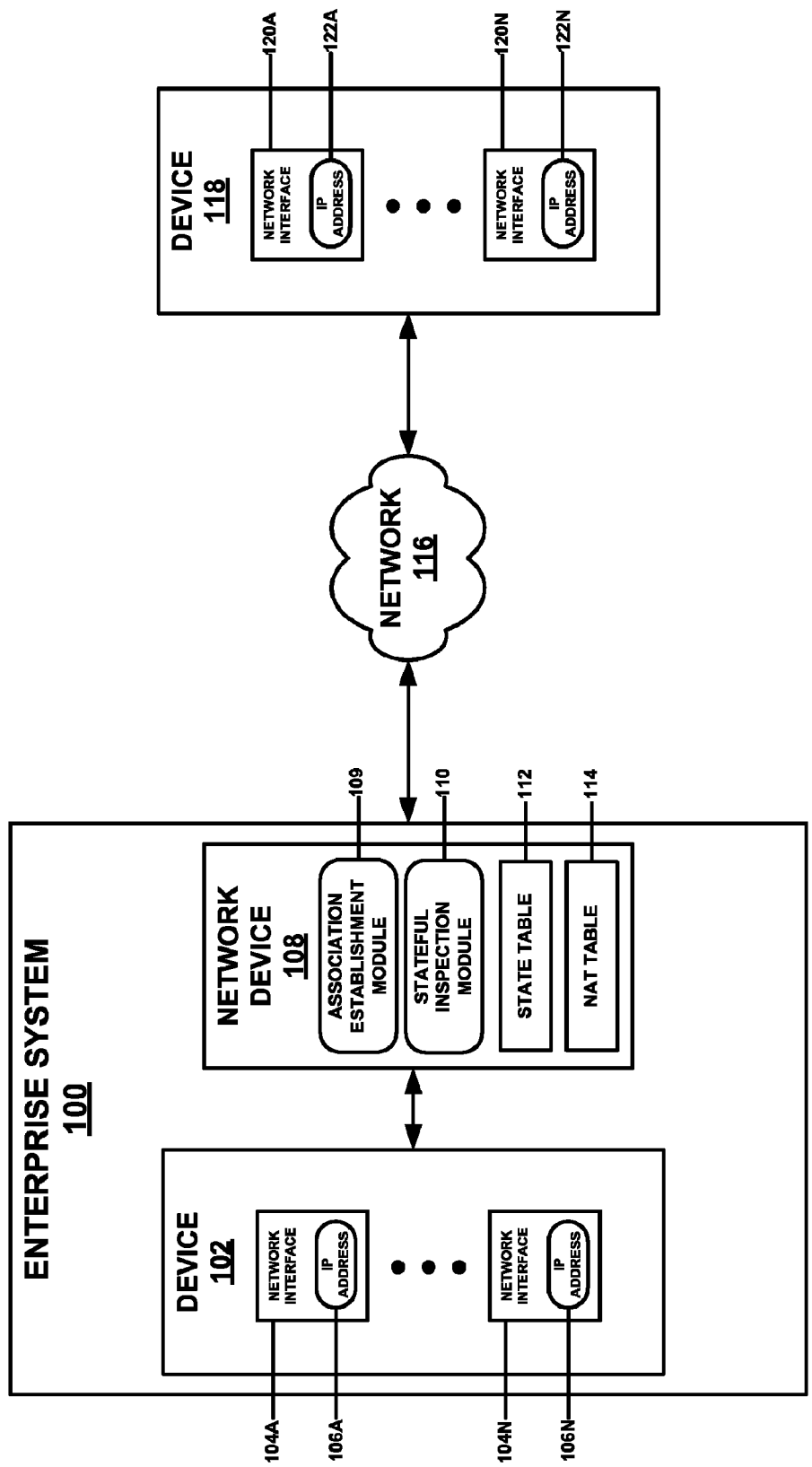
FIG. 1A is a block diagram illustrating two multi-homed devices that are capable of communicating securely via a network device, such as a firewall, according to one embodiment.

FIG. 1A is a block diagram illustrating two multi-homed devices 102 and 118 that are capable of communicating securely via a network device 108, such as a firewall, according to one embodiment. In the example of FIG. 1A, device 102 and network device 108 are part of an enterprise system 100. Enterprise system 100 and device 118 are each communicatively coupled to a network 116. In one embodiment, network 116 is a public network, such as the Internet. Devices 102 and 118 are each multi-homed devices that support multiple IP addresses. Because network device 108 is part of enterprise system 100, device 102 can communicate securely with device 118 through network device 108. Devices 102 and 118 communicate using a communication protocol that supports multi-homing, such as SCTP. Without the use of network device 108, device 102 may be unable to communicate securely with, or trust, device 118.

In the example of FIG. 1A, device 102 supports multi-homing by using at least two network interfaces 104A-104N. In one embodiment, each network interface 104A-104N may comprise a physical network interface card (NIC) part of device 102. Each network interface 104A-104N includes, or is otherwise associated with, a unique IP address within device 102. For example, network interface 104A includes, or is associated with, an IP address 106A, and network interface 104N includes, or is associated with, an IP address 106N. In certain applications, such as voice or wireless applications, device 102 may utilize more than one of its IP address 106A-106N during the course of a communication association, or may even need to use different addresses in cases of failure to any of network interfaces 104A-104N. Network device 108 provides security for data transmitted by or received from device 102 during such a communication association, even when device 102 uses more than one of its IP addresses 106A-106N.

Similarly, device 118 includes at least two network interfaces 120A-120N, which may, in one embodiment, each comprise a physical NIC. Network interface 120A includes, or is associated with, an IP address 122A, and network interface 120N includes, or is associated with, an IP address 122N. Devices 102 and 118 are each computing devices that communicate via network 116 and through network device 108.

Network device 108 manages the security of communications between device 102 and device 118. Network device 108 utilizes an association establishment module 109 and a stateful inspection module 110 to manage secure communications between enterprise system 100 and devices (such as device 118) external to enterprise system 100. In one embodiment, association establishment module 109 and stateful inspection module 110 are software modules that are executed by network device 108. Module 109 manages the establishment of communication associations, such as an association between device 102 and device 118. Module 110 secures such communication associations for enterprise system 100. Module 110 monitors each data message that is exchanged between device 102 and device 118 during a communication association. For each data message that is monitored, module 110 determines whether the message shall be forwarded (i.e., allowed) or dropped. Module 110 may determine to drop a given message if it determines that the message is unsecure, or cannot otherwise be trusted, according to one embodiment.

Modules 109 and 110 also interact with and maintain two tables within network device 108: a state table 112 and a Network Address Translation (NAT) table 114. In certain embodiments, when NAT is not utilized within enterprise system 100, NAT table 114 need not be included within network device 108. NAT table 114, when used, includes address translation information that modules 109 and 110 of network device 108 may use when routing messages. For example, if enterprise system 100 includes a private network, device 102 may hide its private IP addresses, such as IP addresses 106A-106N, from device 118. Instead, device 102 may publish separate, public IP addresses that device 118 may use to communicate with device 102. NAT table 114, then, includes information to translate between the private and public IP addresses that may be used.

In one embodiment, state table 112 is stored within memory of network device 108. State table 112 includes state information about communication associations that are being monitored by network device 108. Thus, state table 112 includes state information about the communication association between device 102 and device 118. Module 109 may store state information for a new association that is established between device 102 and device 118 within state table 112, and module 110 may use and update this state information to secure the association, as data messages are exchanged between device 102 and device 118.

In one embodiment, network device 108 uses association establishment module 109 to process a request from device 102 to establish a communication association between device 102 and device 118. Module 109 stores state information for the communication association in state table 112. The state information includes IP addresses 106A-106N associated with device 102, and also includes IP addresses 122A-122N associated with device 118. Module 110 then uses the state information stored in state table 112 to secure the communication association between device 102 and device 118, as is discussed in more detail below in reference to FIG. 5.

Figure 4:
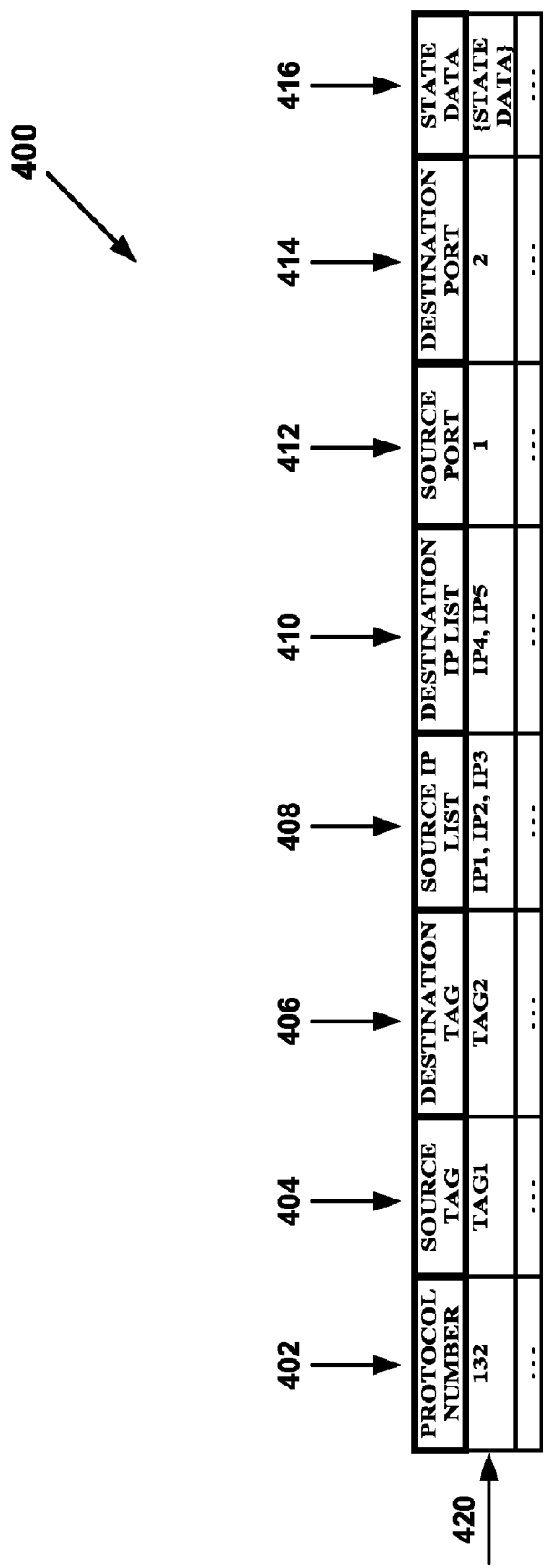
FIG. 4 is a diagram of example state information that may be stored by the firewall shown in FIG. 2 within a state table.

In one embodiment, the state information for the communication association stored in state table 112 comprises a table entry having a seven-tuple data structure. An example of such an entry is shown in FIG. 4. The entry with the seven-tuple data structure has values for the following fields: <protocol number, source IP list, source port, source tag, destination IP list, destination port, destination tag>. The protocol number is the predefined number associated with the communication protocol of the association. (For example, the protocol number for SCTP is 132.) When device 102 and device 118 establish an association, one device will initiate an association request, and another device will accept, or acknowledge, the request. In this disclosure, the device that initiates the association request is considered to be the "source", and the device that accepts the association request is considered the "destination". If, for example, device 102 is the source device and device 118 is the destination device, the source IP list would be the complete list of IP addresses 106A-106N associated with the source device 102, while the destination IP list would be the complete list of IP addresses 122A-122N associated with the destination device 118.

During association establishment, device 102 generates a tag for the association. The tag remains constant throughout the course of the association, according to one embodiment. This tag may comprise a randomly generated number by device 102. Similarly, device 118 also generates a tag for the association, which also remains constant throughout the course of the association, and may also comprise a random number that is generated by device 118. Both of these tags are stored in the seven-tuple data entry within state table 112. If, for example, device 102 is the source device and device 118 is the destination device, the seven-tuple entry will include the tag generated by device 102 as the source tag, and the tag generated by device 118 as the destination tag.

The seven-tuple data entry also includes a source port and a destination port. The source port is the port number of the source, and the destination port is the port number of the destination. The source and destination ports remain constant during the course of an association, according to one embodiment. The source and destination ports may comprise virtual ports, such as SCTP ports. In one embodiment, when communicating with device 118, network interfaces 104A-104N of device 102 utilize the same port number. (Thus, if network interface 104A of device 102 uses port "1" to exchange data with device 118, network interface 104N would also use port "1" when exchanging data with device 118. This switchover from network interface 104A to network interface 104N may be based a determination of device 102 to switch IP addresses. In this case, however, network interface 104N will continue to use the same port number, according to one embodiment.) Similarly, when communicating with device 102, network interfaces 120A-120N of device 118 utilize the same port number.

After the association is established between device 102 and device 118, a multi-stage matching algorithm may be applied by network device 108 for any incoming data message exchanged between device 102 and device 118. For this example, it is assumed that device 102 is the source device and that device 118 is the destination device. When network device 108 receives a data message from either device 102 or device 118, it first parses the message to analyze the source and destination tags that are contained within the message. These tags, as described previously, are randomly generated numbers that are generated by devices 102 and 118. Network device 108 uses the source and destination tags as indices into state table 112 to find one or more matching entries. In one embodiment, state table 112 includes a hash table, and network device 108 uses the source and destination tags as hash indices to identify one or more matching entries within state table 112.

In one embodiment, each matching entry is a seven-tuple entry. Examples of such seven-tuple entries are shown in FIG. 4. Typically, there will be just one seven-tuple entry for each association that has been established between device 102 and device 118. Network device 108 next analyzes the primary IP addresses specified within the data message and searches for these IP addresses within the source and destination IP address lists that are included within the seven-tuple matching entries within state table 112. For example, if the primary IP addresses specified in the message are IP address 106A and IP address 122A, network device 108 will look for IP address 106A within the source IP address list in the matching seven-tuple entries and will also look for IP address 122A within the destination IP address list. If either or both of these IP addresses are not found, network device 108 makes a decision to drop the data message. This data message may not be a trusted communication for the association between device 102 and device 118, because the IP addresses specified in the message do not match those specified within the lists for matching entries in state table 112.

However, if one or more of the matching entries within state table 112 does include the IP addresses of the message within a source IP address list and a destination IP address list, network device 108 then makes a final decision to forward or drop the message based upon the state of the association between device 102 and device 118. If the state of the association allows the message to be processed, network device 108 will then forward the message on to the destination, and update the corresponding entries within state table 112 accordingly. If, however, the state of the association does not allow the message to be processed (e.g., if the state does not indicate that the particular received message is expected at the present time), then network device 108 drops, or discards, the message.

By using this form of multi-stage matching and message processing algorithm, malicious messages (such as SCTP messages) from source/destination IP addresses that violate the state maintained by table 112 of network device 108 will be dropped, and any normal or otherwise expected traffic from source/destination IP addresses that conform to the state of network device 108 will be forwarded. This may, for example, provide protection for certain attacks, such as flooding and/or blind masquerade. In addition, device 102 and/or device 118 may have the flexibility of using different IP addresses during the course of a given communication association. Network device 108 maintains overall state for the association based upon the entire list of IP addresses that may be used by either device, and thus permits seamless transition between use of permitted IP addresses that are maintained within state table 112.

Figure 1B:
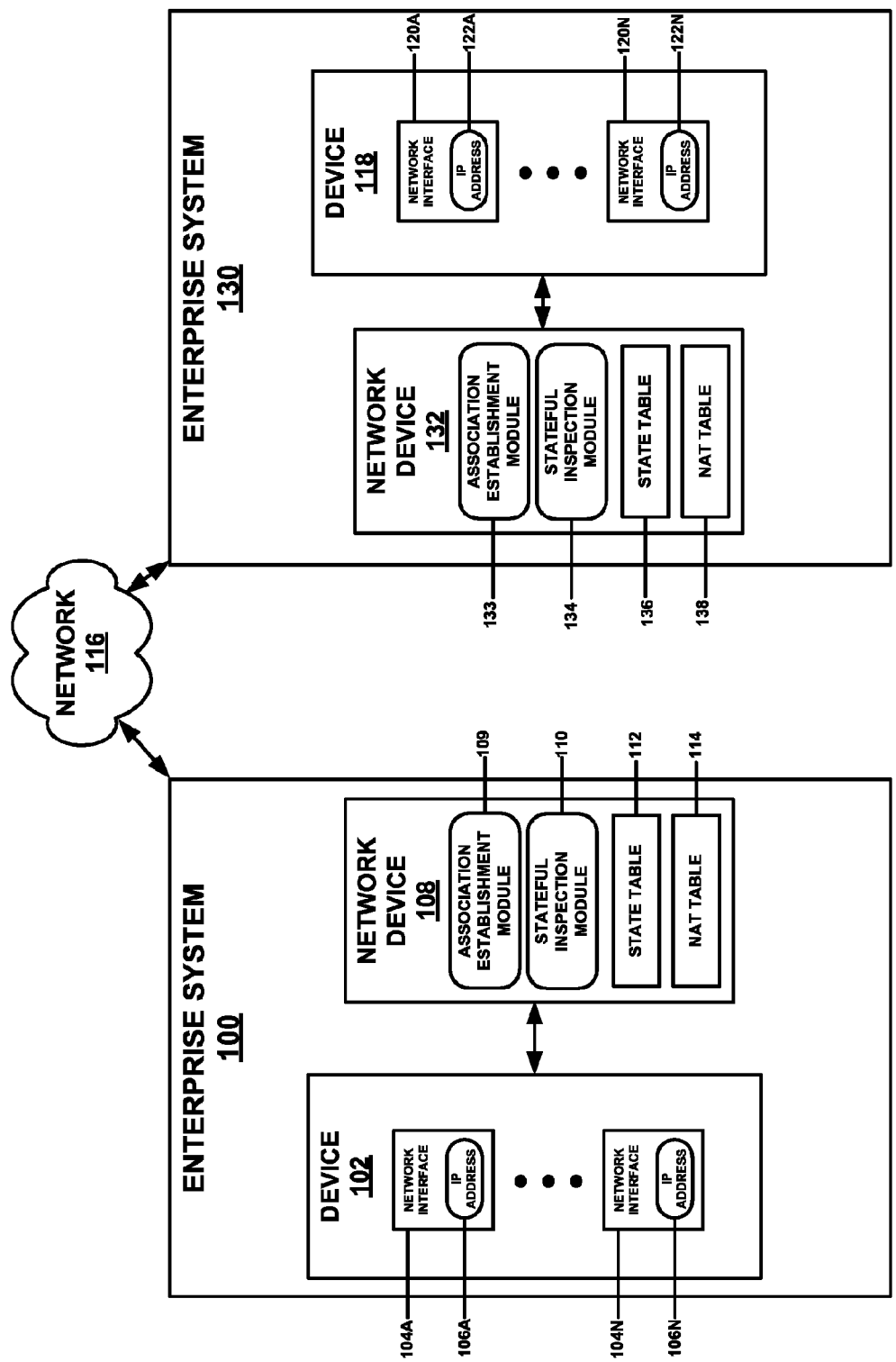
FIG. 1B is a block diagram illustrating another embodiment of the two multi-homed devices that are capable of communicating securely via multiple network devices.

FIG. 1B is a block diagram illustrating another embodiment of the two multi-homed devices 102 and 118 that are capable of communicating securely via network devices 108 and 132, which may comprise firewalls. In this embodiment, device 102 and network device 108 are contained within enterprise system 100, as in FIG. 1A. However, in FIG. 1B, device 118 is part of an enterprise system 130, which further includes network device 132. Thus, in this embodiment, enterprise system 100 includes one network device 108 to secure communications between device 102 and other devices external to enterprise system 100, while enterprise system 130 includes another, separate network device 132 to secure communications between device 118 and other devices external to enterprise system 130. Enterprise systems 100 and 130 communicate via network 116.

In FIG. 1B, network device 108 functions as described in FIG. 1A. Network device 132 is similar to network device 108. Network device 132 includes an association establishment module 133, a stateful inspection module 134, a state table 136, and a NAT table 138 (which may not be included within network device 132 in certain embodiments, similar to network device 108). Module 133 manages the establishment of communication associations with device 118. Module 134 monitors each data message that is exchanged between device 118 and devices external to enterprise system 130 (such as device 102) during one or more communication associations. For each data message that is monitored, module 134 determines whether the message shall be forwarded (i.e., allowed) or dropped. Module 134 may determine to drop a given message if it determines that the message is unsecure, or cannot otherwise be trusted, according to one embodiment.

Module 133 may store state information for a new association that is established between device 102 and device 118 within state table 136, and module 134 may use and update this state information to secure the association, as data messages are exchanged between device 102 and device 118. In one embodiment, network device 132 uses association establishment module 133 to process a request from device 118 to establish a communication association between device 118 and device 102. Module 133 stores state information for the communication association in state table 136. The state information includes IP addresses 122A-122N associated with device 118, and also includes IP addresses 106A-106N associated with device 102. Module 134 then uses the state information stored in state table 136 to secure the communication association between device 118 and device 102 using a multi-stage algorithm similar to that discussed above in reference to FIG. 1A.

Figure 2:
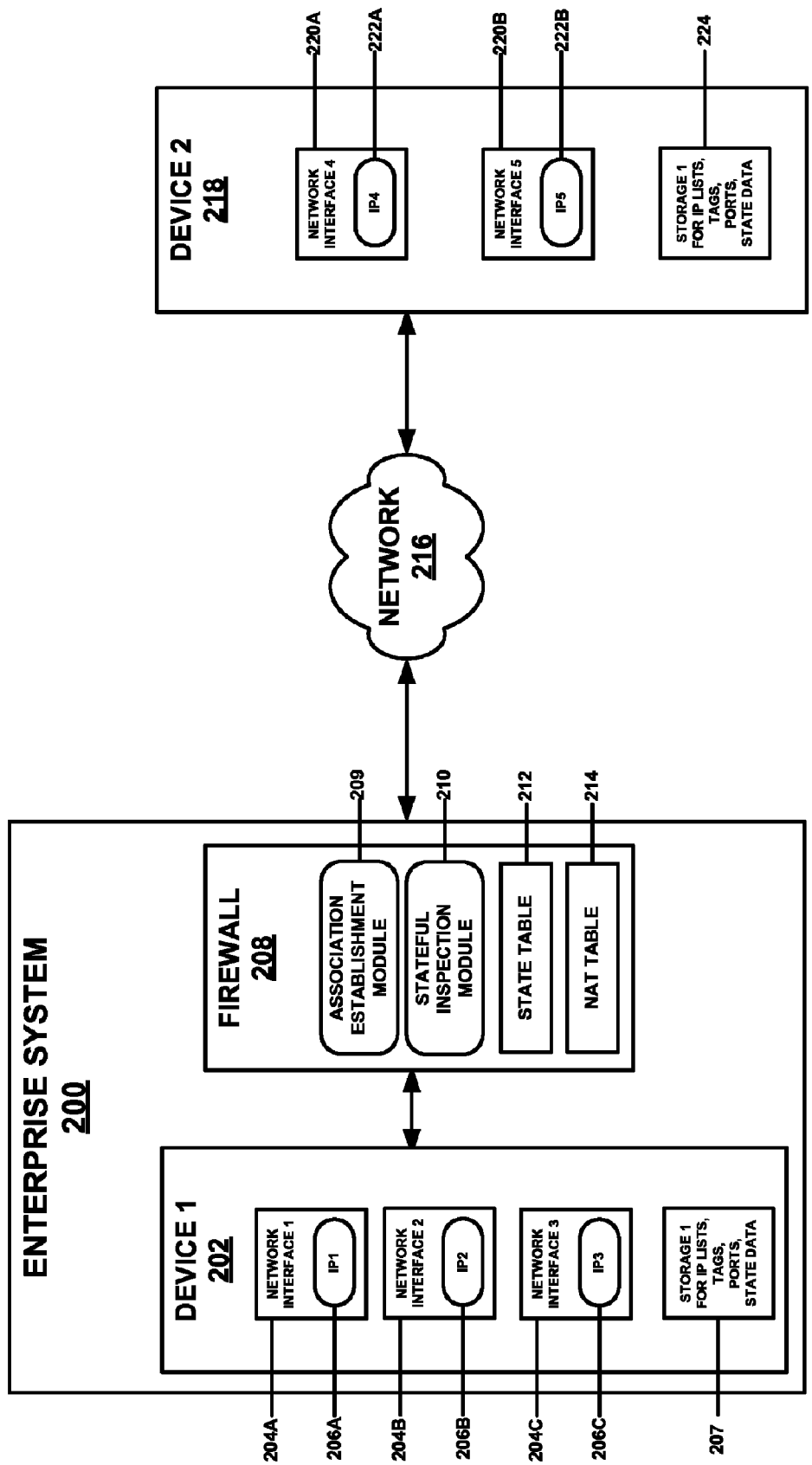
FIG. 2 is a block diagram illustrating an example embodiment of two multi-homed devices that are capable of communicating securely via a firewall.

FIG. 2 is a block diagram illustrating an example embodiment of two multi-homed devices 202 ("DEVICE 1") and 218 ("DEVICE 2") that are capable of communicating securely via firewall 208. In this embodiment, device 202 and firewall 208 are part of enterprise system 200. In the example of FIG. 2, device 202 includes three network interfaces 204A-204C. Each of these network interfaces 204A-204C includes, or is associated with, a unique IP address within device 202. Thus, FIG. 2 shows that network interface 204A ("NETWORK INTERFACE 1") has an IP address 206A ("IP1"), network interface 204B ("NETWORK INTERFACE 2") has an IP address 206B ("IP2"), and network interface 204C ("NETWORK INTERFACE 3") has an IP address 206C ("IP3"). Device 202 may use any one of these IP addresses 206A-206C when communicating with device 218. Device 202 also includes a storage area 207 that is capable of storing information that is accessible by each of network interfaces 204A-204C, such as IP list information, tag information, port information, and state data, which will be described in more detail below.

Device 218 includes two network interfaces 220A and 220B. Each of these network interfaces 220A-220B includes, or is associated with, a unique IP address within device 218. Thus, FIG. 2 shows that network interface 220A ("NETWORK INTERFACE 4") has an IP address 222A ("IP4"), while network interface 220B ("NETWORK INTERFACE 5") has an IP address 222B ("IP5"). Device 218 may use either of these two IP addresses 222A-222B when communicating with device 200. Device 218 also includes a storage area 224 that is capable of storing information that is accessible by each of network interfaces 220A-220B, such as IP list information, tag information, port information, and state data, as will be described in more detail below.

Firewall 208 is similar to network device 108 shown in FIG. 1A. Firewall 208 includes an association establishment module 209 (which is similar to module 109 of FIG. 1A), a stateful inspection module 210 (which is similar to module 110), a state table 212 (which is similar to state table 112), and a NAT table 214 (which is similar to NAT table 114). In certain embodiments, firewall 208 need not include NAT table 214. In these embodiments, NAT may not be implemented.

Figure 3:
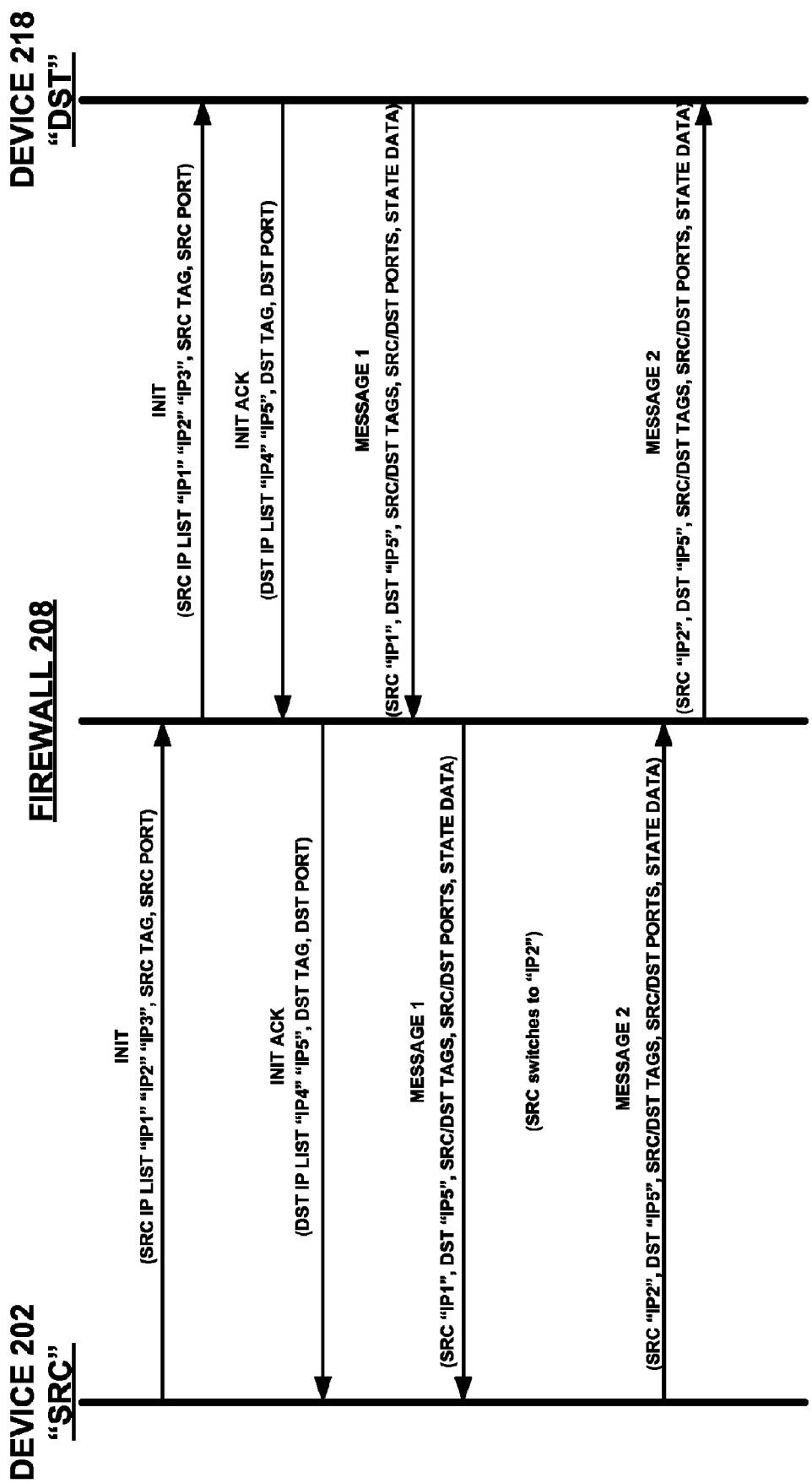
FIG. 3 is an interaction diagram illustrating communication flow between multiple devices, according to one embodiment.
Figure 5:
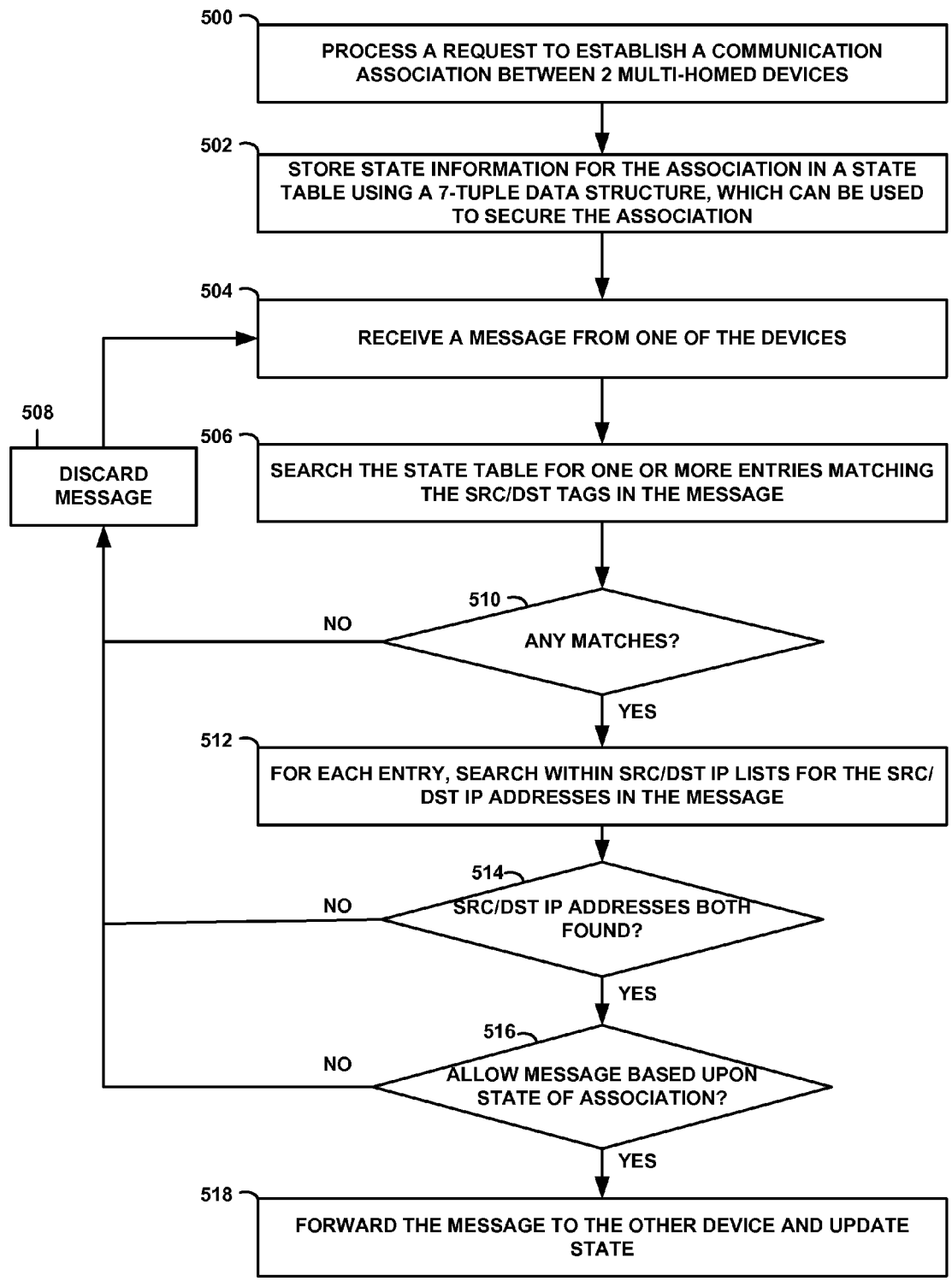
FIG. 5 is a flow diagram illustrating a method that may be performed by one or more of the network devices shown in FIGS. 1A-1B or by the firewall shown in FIG. 2, according to one embodiment.

In one embodiment, firewall 208 uses association establishment module 209 to process a request from device 202 to establish a communication association between device 202 and device 218. Module 209 stores state information for the communication association in state table 212. The state information includes IP addresses 206A-206C ("IP1", "IP2", "IP3") associated with device 202, and also includes IP addresses 222A-222B ("IP4", "IP5") associated with device 218. Module 210 then uses the state information stored in state table 212 to secure the communication association between device 202 and device 218 uses a multi-stage algorithm. FIGS. 3-5 provide further details and are discussed below.

FIG. 3 is an interaction diagram illustrating communication flow between device 202 of FIG. 2 and device 218, according to one embodiment. In FIG. 3, device 202 first establishes a communication association with device 218, and then device 202 and device 218 are capable of exchanging data securely across the association through use of firewall 208. In the example of FIG. 3, device 202 and device 218 communicate using the SCTP protocol. Because device 202 initiates the association request in this example, device 202 is considered the source device (or "SRC", as indicated in FIG. 3), and device 218 is considered the destination device (or "DST").

In an association, one network interface 204A, 204B, or 204C of device 202 initially communicates with one network interface 220A or 220B of device 218. However, because devices 202 and 218 each are multi-homed devices having multiple IP addresses, and because firewall 208 maintains IP list information for devices 202 and 218 within its state table 212, devices 202 and 218 are capable of securely exchanging information using their different network interfaces and associated IP addresses during the course of a given communication association. Thus, if device 202 initially uses IP address 206A for network interface 204A to establish a communication association with IP address 222A for network interface 220A (of device 218), device 202 may subsequently make a change and use IP address 206B for network interface 204B during the course of the same communication association. Likewise, device 218 may switch between IP addresses 222A and 222B during the course of the communication association. (Device 202 and/or device 218 may switch between IP addresses for various reasons, such as potential hardware failures, performance considerations, or load balancing, for example.) Because firewall 208 maintains a list of all IP addresses provided by devices 202 and 218, firewall 208 allows devices 202 and 218 to communicate securely, even if devices 202 and 218 switch between different IP addresses. In addition, because state table 212 includes up-to-date state information for a given association, devices 202 and 218 may switch between different IP addresses seamlessly, according to one embodiment.

Device 202 begins the process of establishing a communication association with device 218 by sending device 218 an "INIT" (initiate) message. One of network interfaces 204A, 204B, or 204C sends the "INIT" message to one of network interfaces 220A or 220B of device 218. Within the "INIT" message, device 202 includes a number of parameters. These parameters include the set of IP addresses, or IP List, for device 202. As is shown in FIG. 2, device 202 includes three distinct IP addresses: IP address 206A ("IP1"), 206B ("IP2"), and 206C ("IP3"). As a result, in the "INIT" message, device 202 includes the parameters "IP1", "IP2", and "IP3", which constitute the IP list for device 202.

Device 202 also includes its tag within "INIT" message. As stated previously, the tag may be a random number generated by device 202 for the association to be established with device 218. In one embodiment, the tag is a 32-bit random number generated by device 202. In addition, device 202 also includes its port number (which may, for example, be a logical or SCTP port, in one embodiment) within the "INIT" message. By including all of these parameters within the "INIT" message, device 202 is able to share its IP list, tag, and port number with device 218. In one embodiment, the IP list and tag are included in SCTP application data within the "INIT" message, while the port number is included within an SCTP header. The "INIT" message also includes additional information, such as the IP address of device 202 that sent the "INIT" message (not shown), according to one embodiment. Thus, in this embodiment, if network interface 204A of device 202 has sent the "INIT" message, the "INIT" message will also include IP address 206A associated with network interface 204A, and also includes the port number used by network interface 204A in sending the message.

Firewall 208 serves as an intermediary between device 202 and device 218 to secure the communication association between the two devices, according to one embodiment.

Thus, firewall 208 receives the "INIT" message and forwards it to device 218. In particular, during association establishment, association establishment module 209 of firewall 208 processes the "INIT" message. Module 209 also stores the IP list ("IP1", "IP2", "IP3") and the tag for device 202 within its state table 212. Module 209 also stores the port number specified within the "INIT" message.

FIG. 4 is a diagram of example state information 400 that may be stored by firewall 208 in its state table 212. In the embodiment of FIG. 4, state information 400 is stored in a table format within state table 212 of firewall 208. State information 400 includes entries for each of columns 402, 404, 406, 408, 410, 412, 414, and 416. In one embodiment, each row of entries of state information 400 within state table 212 corresponds to state information associated with a communication association, such as an association between device 202 and device 218. Column 402 corresponds to a protocol number for an association, column 404 corresponds to a source tag, column 406 corresponds to a destination tag, column 408 corresponds to a source IP list, column 410 corresponds to a destination IP list, column 412 corresponds to a source port, column 414 corresponds to a destination port, and column 416 corresponds to additional state data. Seven-tuple entries for an association are stored within a row of state information 400 within state table 212, and the seven-tuple entries correspond to a row of data contained within columns 402-414, wherein additional state data is contained within column 416 for that row.

In this example, because device 202 is initiating the association request by sending the "INIT" message, device 202 is considered to be the source. Thus, module 209 of firewall 208 stores a row of the state information 400 for the association within a row 420 that is shown in FIG. 4. Within row 420, module 209 stores the IP list for device 202 within column 408 (for the source IP list). Module 209 also stores the tag generated by device 202 for the association in column 404 (source tag) of row 420. In the example of FIG. 4, it is assumed that the source tag is "5". Module 209 also stores the port number of the corresponding network interface 204A, 204B, or 204C that has sent the "INIT" message in column 412 (source port), which is assumed in this example to be port "1". In one embodiment, each of network interfaces 204A-204C of device 202 use the same port number when communicating with one of network interfaces 220A-220B of device 218.

In addition, module 209 also stores the appropriate protocol number for row 420 within column 402. Because, in the example of FIG. 4, the SCTP protocol is being used, module 209 inserts the number "132" within column 402, which corresponds to the SCTP protocol. In one embodiment, various communication protocols have standard, predefined protocol numbers that are commonly used and recognized. In this embodiment, SCTP has a standard protocol number of "132".

Module 209 of firewall 208 also updates additional state data associated with the association in row 420 of state information 400. Column 416 of row 420 includes this additional state data. Firewall 208 is capable of maintaining multiple types of state data within this column 416. For example, the state data may include status information about the association, indicating that the association is being initialized, is established, or has been terminated. In addition, the state data may include packet or message sequence numbers that are used during message transfer between device 202 and device 218. Firewall 208 may use the state data for a given communication association to determine if newly received information or messages are expected or otherwise conform to the state maintained by firewall 208. In one embodiment, firewall may implement a finite-state-machine for state data when processing messages from device 202 or device 218. The finite-state-machine is capable of determining, based upon its present state, whether such messages are expected, whether they should be processed and forwarded, or whether they should be dropped.

Referring again to FIG. 3, when device 218 receives the "INIT" message, it stores the IP list, tag, and port number for device 202 that have been included as parameters within the "INIT" message within its storage area 224 (FIG. 2). Network interface 220A or 220B receives the message. By storing the information provided within the "INIT" message in storage area 224, device 218 maintains the IP list, tag, and port information for device 202 during the course of the association. In one embodiment, both network interface 220A (FIG. 2) and network interface 220B have access to this stored information in storage area 224. In order to accept the association request, network interface 220A or network interface 220B of device 218 sends an "INIT ACK" acknowledgment, or acceptance, message back to device 202. This "INIT ACK" message includes various parameters, similar to the "INIT" message. As shown in FIG. 3, the "INIT ACK" message includes parameters for the IP addresses used ("IP4", "IP5") and tag generated by device 218. The tag may be a random number generated by device 218. In one embodiment, the "INIT ACK" message includes the IP list and tag within SCTP application data of the message. The "INIT ACK" message also includes the port number used by network interfaces 220A and/or 220B.

Firewall 208 receives the "INIT ACK" message sent by device 218, and uses the parameter information contained within the message to further populate row 420 of state information 400 in state table 212. Because the "INIT ACK" message is sent during the association establishment phase, module 209 of firewall 208 processes this message, according to one embodiment. Because, in this example, device 218 is the destination device, module 209 inserts the tag generated by device 218 and included in the "INIT ACK" message within column 406 (destination tag, FIG. 4). Referring to the example of FIG. 4, it is assumed that this tag has a value of "10". Module 209 inserts the IP list of device 218 ("IP4", "IP5") in column 410 (destination IP list), and also inserts the port number within column 414 (destination port). During the course of the association, network interface 220A or network interface 220B of device 218 each use the same port number when communicating with one of the network interfaces 204A-204C of device 202, in one embodiment.

Due to the receipt of the "INIT ACK" message, module 209 may also update the state data in column 416 of row 420 to indicate that the association between device 202 and device 218 has been established. The state data maintained in column 416 of row 420 is quite valuable, because it allows firewall 208 to access up-to-date state data for the given association between device 202 and device 218, even when these devices switch between different IP addresses. Columns 408 and 410 of row 420 maintain the complete IP address lists for both device 202 and device 218, and firewall 208 can therefore associate these addresses with a single association between the devices and common status data that is maintained in column 416 of row 420.

After updating state table 212, module 209 of firewall 208 forwards the "INIT ACK" message to network interface 204A, 204B, or 204C of device 202. Upon receipt, device 202 stores the IP list, tag, and port information for device 218 in its storage area 207. In one embodiment, device 202 makes this stored information in storage area 207 available to each of network interfaces 204A-204C. Once device 202 has received and processed the "INIT ACK" message, devices 202 and 218 may begin exchanging data messages for the newly established associated. Firewall 208 secures the data message exchange using its state table 212, as will be described in more detail below.

Referring again to the example of FIG. 3, it is assumed that, after the association is established, device 218 wishes to send a data message to device 202 ("MESSAGE 1"). It is further assumed that device 218 selects network device 220B to send the message to network device 204A of device 202. Therefore, device 218 uses its IP address 222B ("IP5") to send "MESSAGE 1" to IP address 206A ("IP1") of device 202. As a result, "IP5" and "IP1" are specified within "MESSAGE 1", as shown in FIG. 3. These are included within the IP header of "MESSAGE 1", according to one embodiment. Device 218 also includes the tags corresponding to the communication association within "MESSAGE 1". These tags comprise the tag generated by device 202 (source tag) and the tag generated by device 218 (destination tag), which each correspond to the association. Each of the network interfaces 220A and 220B have access to the values of the tags from the stored information within storage area 224. In one embodiment, these tags are included within SCTP application data of "MESSAGE 1".

In addition, source and destination port numbers are included within "MESSAGE 1". In one embodiment, these port numbers are included within an SCTP header of "MESSAGE 1". Network interface 220A or 220B may obtain the port numbers used for the association from its storage area 224. Additional state data may also be included within "MESSAGE 1". For example, device 218 may include status or sequence number (e.g., packet or message sequence numbers) within the state data of "MESSAGE 1".

Firewall 208 processes "MESSAGE 1" upon its receipt from device 218. In particular, stateful inspection module 210 processes and inspects the message. Module 210 uses a multi-stage inspection algorithm for inspecting the message and determining whether the message is to be dropped or forwarded to device 202. First, module 210 extracts the tags within "MESSAGE 1" and uses both of these tags (source and destination tags) to identify the appropriate row or entry within state table 212 that corresponds to the association. In one embodiment, the source and destination tags are used as indices into state table 212 to uniquely or properly identify the row that corresponds to the association. In one embodiment, state table 212 comprises a hash table, where the source and destination tags serve as hash indices.

If no row entries are found within state table 212, module 210 drops "MESSAGE 1". Module 210 decides to drop the message because it is unable to identify any association that corresponds to the specified source and destination tags. In this fashion, module 210 can filter out or drop any messages received from foreign devices other than device 218, or any devices that do not specify the proper source and destination tags. This first stage of the multi-stage inspection algorithm provides a first level of security screening for messages passing through firewall 208.

If, however, module 210 identifies a row within state table 212 that is indexed by the source and destination tags specified within "MESSAGE 1", module 210 proceeds to the second stage of inspection. In this stage, module 210 inspects the source and destination IP lists of the matching row entry. For example, if module 210 identifies row 420 in FIG. 4 as the matching row, module 210 inspects the source IP address list in column 408 and the destination IP address list in column 410. Module 210 then determines if the source and destination IP addresses included within "MESSAGE 1" are included within the corresponding source and destination IP address lists. If either or both addresses are not included within the corresponding lists, module 210 drops the message. The IP addresses shown in columns 408 and 410 include the exclusive lists of permitted IP addresses for the source and destination devices in a given communication association, and module 210 drops any messages that do not specify source and destination IP addresses that are included in these source and destination IP address lists. Module 210 may also confirm that the source and destination port numbers included within "MESSAGE 1" match those included within columns 412 and 414 of row 420.

If, however, the source IP address specified in "MESSAGE 1" is included within the source IP list of column 408, and the destination IP address specified in "MESSAGE 1" is included within the destination IP list of column 410, module 210 will proceed to the third stage of inspection. Thus, in the example shown in FIG. 3, "MESSAGE 1" specifies a source IP address of "IP1" and a destination IP address of "IP5". If module 210 has used the source and destination tags of "MESSAGE 1" to identify row 420 of FIG. 4 as the entry corresponding to the association between device 202 and device 218, module inspects columns 408 and 410 of row 420. In column 408, module 410 determines that the source IP address "IP1" specified in "MESSAGE 1" is one of the IP addresses included within the source IP list. And, module 410 also determines that the destination IP address "IP5" specified in "MESSAGE 1" is one of the IP addresses included within the destination IP list. In this case, module 210 moves to the third stage of inspection.

In the third stage of inspection, module 210 analyzes the state data contained within column 416 of row 420. As stated above, this state data includes various additional state data related to the communication association for row 420. This state data may include certain status information, such as the current status of the association as maintained by firewall 208. For example, the status may indicate that the association is being established, has been established, is temporarily on standby, or has been terminated. In addition, the state data may include specific information about message flow between devices 202 and 218. For example, the state data may include message or packet sequence numbering information, such that firewall 208 knows information about specific packet or message flow ordering. During this phase of the inspection algorithm, module 210 may inspect or otherwise use the state data contained within "MESSAGE 1" and compare such data to its own state data in column 416 of state table 212.

In the third stage of inspection, module 210 analyzes this state data to determine if "MESSAGE 1" satisfies, or meets, the state of the association based upon this state data, or is otherwise expected by module 210 given the state of the association. For example, if the state data indicates that the association has been terminated, module 210 would not expect to receive "MESSAGE 1" for this association from device 218. Or, if the state data indicates that the prior received message or packet from device 218 had a specified sequence number, module 210 would not expect to receive a "MESSAGE 1" with an inappropriate or incorrect subsequent sequence number. In such cases, module 210 determines to drop, or discard, "MESSAGE 1".

However, if module 210 determines, from its analysis of the state data, that "MESSAGE 1" conforms to the current state of the association, module 210 will forward "MESSAGE 1" to device 202, which is the case shown in FIG. 3. Because the IP address specified in "MESSAGE 1" is "IP1" (which corresponds to IP address 206A in FIG. 2), module 210 routes "MESSAGE 1" to network interface 204A. In addition, module 210 updates the state data in column 416 of row 420, as appropriate. For example, module 210 may update any status information, and may also update message or packet sequence numbers, in some cases. When device 202 receives the message, it updates any necessary state data for the association (such as status or sequence information) within its storage area 207, according to one embodiment.

In FIG. 3, it is assumed that, after network interface 204A receives "MESSAGE 1", that device 202 switches over to network interface 204B, which uses IP address 206B ("IP2"). For example, device 202 may make such a switch if there is some form of problem of failure with network interface 204A, or if device 202 wishes to perform load balancing amongst its network interfaces 204A-204C. Device 202 then uses network interface 204B to send a second message, "MESSAGE 2", to device 218. In particular, network interface 204B sends "MESSSAGE 2" to "IP5", which was the same IP address used by device 218 when sending "MESSAGE 1" to device 202. "IP5" corresponds to IP address 222B, which is associated with network interface 220B. As a result, "MESSAGE 2" specifies a source IP address of "IP2", as shown in FIG. 3, and also specifies a destination IP address of "IP5". "MESSAGE 2" also includes the source tag of device 202 and the destination tag of device 218, as well as the source and destination ports. Device 202 accesses its storage area 207 to obtain such information. Because device 202 has received "MESSAGE 1" and is now sending "MESSAGE 2", it has network interface 204B include any subsequent, ordered sequence numbers within "MESSAGE 2", according to one embodiment, such that firewall 208 recognizes "MESSAGE 2" as the next message in the chain. For example, device 202 may access state data for the association within its storage area 207 to determine any appropriate sequence numbers that are to be used.

When firewall 208 receives "MESSAGE 2", it uses its stateful inspection module 210 to again inspect the message uses the multi-stage inspection algorithm. Module 210 first parses "MESSAGE 2" to obtain the source and destination tags, which are used by module 210 to identify row 420 of state information 400 in state table 212 for the association between device 202 and device 218. (In this case, it is again assumed that the source tag has a value of "5", as shown in FIG. 4, and that the destination tag has a value of "10".)

Module 210 then determines if the source IP address "IP2" specified in "MESSAGE 2" and the destination IP address "IP5" are included within columns 408 and 410 of matching row 420. Module 210 is able to identify "IP2" within the source IP list of column 408, and to also identify "IP5" within the destination IP list of column 410. Module 210 also confirms the source and destination ports specified within "MESSAGE 2" with the source and destination ports includes in columns 412 and 414.

Lastly, module 210 analyzes the state data for the association in column 416 of row 420 to confirm that "MESSAGE 2" conforms to the expected state. As described earlier, module 210 may analyze status information or sequence numbering information within the state data in column 416 to confirm that "MESSAGE 2" is expected that conforms to the state of the association. Module 210 may use state data contained within "MESSAGE 2", such as sequence ordering information for the message, and use such data when analyzing the state data in column 416 of its state table 212 when making its final determination as to whether to drop or forward "MESSAGE 2" to network interface 220B of device 218 (which is associated with "IP5", or IP address 222B). Assuming that "MESSAGE 2" is allowed, firewall 208 forwards the message to device 218, and also correspondingly updates its state data for the association in column 416 of row 420. Upon receipt of the message, device 218 updates its state data for the association in its storage area 224, according to one embodiment.

Subsequently, device 202 and 218 may periodically exchange heartbeat messages, according to one embodiment. In this embodiment, each heartbeat message includes parameters similar to those of the other data messages, such as "MESSAGE 1" and "MESSAGE 2". Thus, the heartbeat messages include source and destination IP addresses, source and destination tags, source and destination port, and also may include additional state data. Device 202 uses heartbeat messages received from device 218 to confirm continued existence and operation of IP addresses associated with device 218 (such as "IP4" and "IP5"). Similarly, device 218 uses heartbeat messages received from device 202 to confirm continued existence and operation of IP addresses associated with device 202 (such as "IP1", "IP2", and "IP3").

By maintaining source IP address lists within column 408 and destination IP address lists within column 410 in state table 212, firewall 208 may securely manage an association between the multi-homed devices 202 and 218. Devices 202 and/or 218 may seamlessly switch between multiple different of their available IP addresses, as needed, during the course of a given communication association, and firewall 208 is able to securely manage the association amongst the various used IP addresses while centrally maintaining state information for the association in state table 212. Each seven-tuple entry, such as row entry 420 of FIG. 4, corresponds to an association, and each seven-tuple entry further includes state information for the association. In addition, firewall 208 is able to prohibit any external or possible rogue devices for interfering with or participating in the association between device 202 and 218. Firewall 208 may identify any unexpected or unsecure messages that arrive using its multi-stage matching algorithm, and may drop any messages that do not have appropriate tags, IP addresses, or otherwise conform to the state of the association.

FIG. 4 shows only example row 420 for a communication association between 202 and 218. Of course, state information 400 of state table 212 may include multiple additional rows that relate to other communication associations that are managed or monitored by firewall 208.

FIG. 5 is a flow diagram illustrating a method that may be performed by network device 108 or 132 (FIGS. 1A-1B) or by firewall 208 (FIG. 2), according to one embodiment. For purposes only of illustration in the description below, it will be assumed that the method shown in FIG. 5 is performed by firewall 208. The shown method includes acts 500, 502, 504, 506, 508, 512, and 518, and also includes checkpoints 510, 514, and 516. Checkpoints 510, 514, and 516 each correspond to one stage of a multi-stage inspection algorithm, according to one embodiment.

In act 500, firewall 208 uses its association establishment module 209 to process a request to establish a communication association between two multi-homed devices 202 and 218. Device 202 or device 218 may initiate the request, such as by sending an "INIT" message, according to one embodiment where the SCTP protocol is used. The device receiving the request may accept, or acknowledge, the request, such as by sending an "INIT ACK" message.

In act 502, module 209 stores state information for the association in state table 212 using a seven-tuple data structure and also state data for the association. By storing and using such information, firewall 208 is capable of securing the communication association between devices 202 and 218.

In act 504, firewall 208 receives a communication message from one of devices 202 or 218. Stateful inspection module 210 processes this message. In act 506, module 210 searches state table 212 for one or more entries that include or match the source and destination tags included within the message. Each tag is a random, 32-bit number that has been generated by one of devices 202 or 218. The source tag corresponds to the tag generated by the source device (i.e., the device that has initiated the request for the association), and the destination tag corresponds to the tag generated by the destination device.

At checkpoint 510, module 210 determines if there are any hits for matching entries in state table 212. If there are none, module 210 discards the message in act 508. If there is a hit, however, module 210 then, in act 512, searches the source and destination lists for each matching entry. Module 210 determines, at checkpoint 514, whether the source and destination IP addresses specified by the received message are included within the source and destination IP lists. If both source and destination addresses are found within the corresponding lists, module 210 proceeds to the next stage in the inspection algorithm (checkpoint 516). Otherwise, module 210 discards the message in act 508.

At checkpoint 516, module 210 makes a final determination whether to allow or discard the message based upon the state of the association. Module 210 accesses state data for the one or more matching seven-tuple entries when making this final determination. If the state does not allow the message to be processed, module 210 discards the message in act 508. If the state does allow the message to be processed, however, firewall 208 forwards the message to device 202 or 218 and updates its state table for the matching seven-tuple entries in its state table 212.

In certain embodiments, firewall 208 may perform only a subset of the acts, or utilize only a subset of the checkpoints, shown in FIG. 5 when performing inspection of incoming data messages. In certain embodiments, firewall 208 may use other techniques for searching the state table and identifying matching entries, other than by using the source and destination tags specified within the incoming data message.

Figure 6:
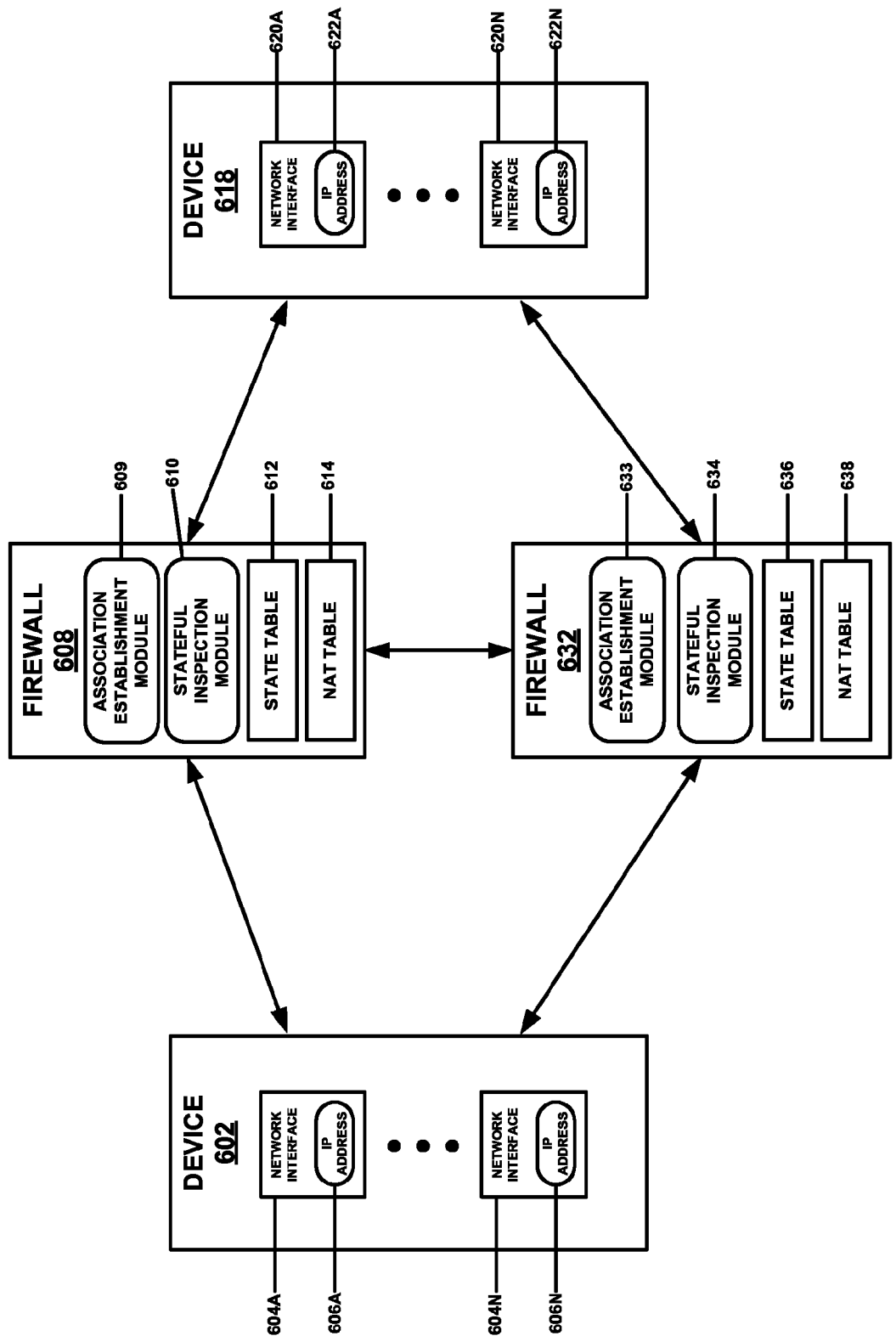
FIG. 6 is a block diagram illustrating the use of multiple firewalls that are each coupled to multiple user devices, according to one embodiment.

FIG. 6 is a block diagram illustrating the use of multiple firewalls 608 and 632 each coupled to devices 602 and 618, according to one embodiment. In this embodiment, the use of multiple firewalls 608 and 632 provides a high availability (HA) configuration. Devices 602 and 618 each comprise multi-homed devices that have multiple IP addresses. Device 602 includes at least two network interfaces 604A-604N. Each network interface 604A-604N includes or is otherwise associated with an IP address. Thus, network interface 604A is associated with an IP address 606A, and network interface 604N is associated with an IP address 606N. Similarly, device 618 includes at least two network interfaces 620A-620N. Network interface 620A is associated with an IP address 622A, and network interface 620N is associated with an IP address 622N. Although not shown in FIG. 6, each device 602 and 618 may, in one embodiment, further include a storage area that is capable of storing IP list, tag, port, and state data information, similar to storage areas 207 and 224 shown in FIG. 2.

Each device 602 and 618 is coupled both to firewall 608 and firewall 632. In addition, firewall 608 is coupled to firewall 632. Firewall 608 includes an association establishment module 609, a stateful inspection module 610, a state table 612, and a NAT table 614. Similarly, firewall 632 includes an association establishment module 633, a stateful inspection module 634, a state table 636, and a NAT table 638. Within a high-availability configuration, wherein firewalls 608 and 632 are each active, both of firewalls 608 and 632 are capable of processing data and messages that are exchanged between devices 602 and 618 during a given communication association. In one embodiment, state tables 612 and 636 are synchronized between firewalls 608 and 632. In such a configuration, redundancy may be provided. Thus, for example, if firewall 608 were to experience problems or a failure, firewall 632 could take over the processing responsibilities previously handled by firewall 608.

In addition, to achieve load balancing, according to one embodiment, firewall 608 may process messages exchanged between certain IP addresses of devices 602 and 618, while firewall 632 may process messages exchanged between other IP addresses. For example, firewall 608 may be configured to process messages exchanged between IP address 606A, of network interface 604A, and IP address 622A of network interface 620A. Firewall 632 may be configured to process messages exchanged between IP address 606N, of network interface 604N, and IP address 622N of network interface 620N. However, even in this case, state table 612 of firewall 608 is synchronized with state table 636 of firewall 632. As a result, each state table 612 and 636 includes a complete list of IP addresses 606A-606N and IP addresses 622A-622N for a given communication association between devices 602 and 618.

When messages are exchanged between network interface 604A (using IP address 606A) and network interface 620A (using IP address 622A), firewall 608 may be configured to process these messages, as outlined above, and utilizes a multi-stage inspection algorithm similar to that described previously. Likewise, firewall 6323 may be configured to use a multi-stage inspection algorithm when processing messages between network interface 604N (using IP address 606N) and network interface 620N (using IP address 622N). Thus, FIG. 6 shows an example of how firewalls 608 and 632 can implement load balancing by taking advantage of the HA redundancy while maintaining the resilience of the communication association between multi-homed devices 602 and 618.

In one or more example embodiments, the functions described above may be implemented in hardware, software, firmware, or any combination thereof. If implemented in software, the functions may be stored on or transmitted over as one or more instructions or code on a computer-readable medium that may be executed by a processor, such as a processor of network device 108, network device 132, firewall 208, firewall 608, and/or firewall 632. Computer-readable media includes both computer storage media and communication media including any medium that facilitates transfer of a computer program from one place to another. A storage media may be any available media that can be accessed by a computer. By way of example, and not limitation, such computer-readable media can comprise random-access memory (RAM), read-only memory (ROM), Electrically Erasable Programmable ROM (EEPROM), Compact Disc ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), and floppy disk. Combinations of the above should also be included within the scope of computer-readable media.

Various embodiments of the invention have been described. These and other embodiments are within the scope of the following claims.

The invention claimed is:

1. A method comprising:
processing, by a network device, a request to establish a communication association between a first device and a second device, wherein the first device comprises a first multi-homed device having a plurality of Internet Protocol (IP) addresses that are each associated with a respective network interface of the first device, wherein the second device comprises a second multi-homed device having a plurality of IP addresses that are each associated with a respective network interface of the second device, and wherein the network device is distinct from both the first and second devices;
storing, by the network device, state information for the communication association, wherein the state information includes the plurality of IP addresses of the first device and the plurality of IP addresses of the second device; and
securing, by the network device, the communication association between the first device and the second device using the state information.

2. The method of claim 1, wherein processing the request to establish the communication association comprises:
receiving an initiation message from the first device to request establishment of the communication association between the first device and the second device; and
receiving an acknowledgment message from the second device to acknowledge establishment of the communication association.

3. The method of claim 2, wherein processing the request to establish the communication association further comprises:
upon receipt of the initiation message, sending the initiation message to the second device; and
upon receipt of the acknowledgement message, sending the acknowledgment message to the first device.

4. The method of claim 2, wherein:
the initiation message specifies the IP addresses of the first device, and further specifies a first tag for the communication association generated by the first device; and
the acknowledgement message specifies the IP addresses of the second device, and further specifies a second tag for the communication association generated by the second device.

5. The method of claim 1, wherein processing the request to establish the communication association comprises:
receiving, from the first device, the IP addresses of the first device; and
receiving, from the second device, the IP addresses of the second device.

6. The method of claim 1, wherein securing the communication association comprises:
receiving a data message from the first device, the data message specifying a first IP address of the first device as a source of the data message, and also specifying a second IP address of the second device as a destination of the data message;
determining whether the first IP address specified in the data message is one of the IP addresses of the first device stored within the state information; and
determining whether the second IP address specified in the data message is one of the IP addresses of the second device stored within the state information.

7. The method of claim 6, wherein securing the communication association further comprises discarding the data message when the first IP address specified in the data message is not one of the IP addresses of the first device stored within the state information, or when the second IP address specified in the data message is not one of the IP addresses of the second device stored within the state information.

8. The method of claim 6, wherein when the first IP address specified in the data message is one of the IP addresses of the first device stored within the state information, and when the second IP address specified in the data message is one of the IP addresses of the second device stored within the state information, securing the communication association further comprises sending the data message to the second device.

9. The method of claim 8, wherein sending the data message to the second device comprises sending the data message to the second IP address specified within the data message.

10. The method of claim 6, wherein when the first IP address specified in the data message is one of the IP addresses of the first device stored within the state information, and when the second IP address specified in the data message is one of the IP addresses of the second device stored within the state information, securing the communication association further comprises:
determining if the data message is allowed for the communication association based upon additional data stored within the state information;
sending the data message to the second device when the data message is allowed; and
discarding the data message when the data message is not allowed.

11. The method of claim 6, wherein the data message further specifies a first tag for the communication association generated by the first device and a second tag for the communication association generated by the second device, and wherein securing the communication association further comprises:
determining whether the first tag and the second tag specified in the data message correspond to the state information for the communication association.

12. The method of claim 11, wherein when the first IP address specified in the data message is one of the IP addresses of the first device stored within the state information, wherein when the second IP address specified in the data message is one of the IP addresses of the second device stored within the state information, and wherein when the first tag and the second tag specified in the data message correspond to the state information for the communication association, securing the communication association further comprises:
determining if the data message is allowed for the communication association based upon additional data stored within the state information;
sending the data message to the second device when the data message is allowed; and
discarding the data message when the data message is not allowed.

13. The method of claim 11, wherein determining whether the first tag and the second tag specified in the data message correspond to the state information for the communication association comprises determining whether the first and second tags properly index the state information for the communication association.

14. The method of claim 1, wherein storing the state information for the communication association comprises storing the state information in a state table.

15. The method of claim 1, wherein the communication association comprises an SCTP (Stream Control Transmission Protocol) association.

16. The method of claim 1, wherein the method is performed by a firewall.

17. A non-transitory computer-readable medium comprising instructions for causing a processor of a network device to:
process a request to establish a communication association between a first device and a second device, wherein the first device comprises a first multi-homed device having a plurality of Internet Protocol (IP) addresses that are each associated with a respective network interface of the first device, wherein the second device comprises a second multi-homed device having a plurality of IP addresses that are each associated with a respective network interface of the second device, and wherein the network device is distinct from both the first and second devices;
store state information for the communication association, wherein the state information includes the plurality of IP addresses of the first device and the plurality of IP addresses of the second device; and
secure the communication association between the first device and the second device using the state information.

18. A network device comprising:
a processor;
a state table configured to store information for communication associations between devices;
an association establishment module implemented by the processor to process a request to establish a communication association between a first device and a second device and to store state information for the communication association in the state table, wherein the first device comprises a first multi-homed device having a plurality of Internet Protocol (IP) addresses that are each associated with a respective network interface of the first device, wherein the second device comprises a second multi-homed device having a plurality of IP addresses that are each associated with a respective network interface of the second device, wherein the network device is distinct from both the first and second devices, and wherein the state information includes the plurality of IP addresses of the first device and the plurality of IP addresses of the second device; and
an inspection module implemented by the processor to secure the communication association between the first device and the second device by using the state information stored in the state table.

19. The network device of claim 18, wherein the association establishment module is configured to process the request to establish the communication association by being configured to receive an initiation message from the first device to request establishment of the communication association between the first device and the second device, and to receive an acknowledgment message from the second device to acknowledge establishment of the communication association.

20. The network device of claim 19, wherein the association establishment module is configured to process the request to establish the communication association by being further configured to send the initiation message to the second device upon receipt of the initiation message, and to send the acknowledgment message to the first device upon receipt of the acknowledgement message.

21. The network device of claim 19, wherein:
the initiation message specifies the IP addresses of the first device, and further specifies a first tag for the communication association generated by the first device; and
the acknowledgement message specifies the IP addresses of the second device, and further specifies a second tag for the communication association generated by the second device.

22. The network device of claim 18, wherein the association establishment module is configured to process the request to establish the communication association by being configured to receive, from the first device, the IP addresses of the first device, and to receive, from the second device, the IP addresses of the second device.

23. The network device of claim 18, wherein the inspection module is configured to secure the communication association by being configured to receive a data message from the first device, the data message specifying a first IP address of the first device as a source of the data message, and also specifying a second IP address of the second device as a destination of the data message, to determine whether the first IP address specified in the data message is one of the IP addresses of the first device stored within the state information, and to the determine whether the second IP address specified in the data message is one of the IP addresses of the second device stored within the state information.

24. The network device of claim 23, wherein the inspection module is configured to secure the communication association by being further configured to discard the data message when the first IP address specified in the data message is not one of the IP addresses of the first device stored within the state information, or when the second IP address specified in the data message is not one of the IP addresses of the second device stored within the state information.

25. The network device of claim 23, wherein the inspection module is configured to secure the communication association by being further configured to send the data message to the second device when the first IP address specified in the data message is one of the IP addresses of the first device stored within the state information, and when the second IP address specified in the data message is one of the IP addresses of the second device stored within the state information.

26. The network device of claim 25, wherein the inspection module is configured to send the data message to the second device by being configured to send the data message to the second IP address specified within the data message.

27. The network device of claim 23, wherein when the first IP address specified in the data message is one of the IP addresses of the first device stored within the state information, and when the second IP address specified in the data message is one of the IP addresses of the second device stored within the state information, the inspection module is configured to secure the communication association by being further configured to determine if the data message is allowed for the communication association based upon additional data stored within the state information, to send the data message to the second device when the data message is allowed, and to discard the data message when the data message is not allowed.

28. The network device of claim 23, wherein the data message further specifies a first tag for the communication association generated by the first device and a second tag for the communication association generated by the second device, and wherein the inspection module is configured to secure the communication association by being further configured to determine whether the first tag and the second tag specified in the data message correspond to the state information for the communication association.

29. The network device of claim 28, wherein when the first IP address specified in the data message is one of the IP addresses of the first device stored within the state information, when the second IP address specified in the data message is one of the IP addresses of the second device stored within the state information, and when the first tag and the second tag specified in the data message correspond to the state information for the communication association, the inspection module is configured to secure the communication association by being further configured to determine if the data message is allowed for the communication association based upon additional data stored within the state information, to send the data message to the second device when the data message is allowed, and to discard the data message when the data message is not allowed.

30. The network device of claim 28, wherein the inspection module is configured to determine whether the first tag and the second tag specified in the data message correspond to the state information for the communication association by being configured to determine whether the first and second tags properly index the state information for the communication association.

31. The network device of claim 18, wherein the communication association comprises an SCTP (Stream Control Transmission Protocol) association.

32. The network device of claim 18, wherein the network device comprises a firewall.

33. A network device comprising:
means for processing a request to establish a communication association between a first device and a second device, wherein the first device comprises a first multi-homed device having a plurality of Internet Protocol (IP) addresses that are each associated with a respective network interface of the first device, wherein the second device comprises a second multi-homed device having a plurality of IP addresses that are each associated with a respective network interface of the second device, and wherein the network device is distinct from both the first and second devices;
means for storing state information for the communication association, wherein the state information includes the plurality of IP addresses of the first device and the plurality of IP addresses of the second device; and
means for securing the communication association between the first device and the second device using the state information.

* * * * *